United States Patent
Ng

(10) Patent No.: US 9,685,096 B2
(45) Date of Patent: Jun. 20, 2017

(54) GUIDANCE SYSTEM FOR LEARNING TO PLAY PIANO

(71) Applicant: Fonglui Christopher Ng, San Diego, CA (US)

(72) Inventor: Fonglui Christopher Ng, San Diego, CA (US)

( * ) Notice: Subject to any disclaimer, the term of this patent is extended or adjusted under 35 U.S.C. 154(b) by 0 days.

(21) Appl. No.: 14/964,730

(22) Filed: Dec. 10, 2015

(65) Prior Publication Data

US 2016/0196763 A1    Jul. 7, 2016

Related U.S. Application Data

(60) Provisional application No. 62/099,782, filed on Jan. 5, 2015.

(51) Int. Cl.
| | | |
|---|---|---|
| *G09B 15/08* | (2006.01) | |
| *G09B 15/02* | (2006.01) | |
| *G10H 1/00* | (2006.01) | |
| *G09B 15/00* | (2006.01) | |
| *H04N 9/31* | (2006.01) | |
| *G03B 21/28* | (2006.01) | |

(52) U.S. Cl.
CPC ......... *G09B 15/023* (2013.01); *G09B 15/003* (2013.01); *G10H 1/0066* (2013.01); *H04N 9/3194* (2013.01); *G03B 21/28* (2013.01); *G10H 2220/265* (2013.01); *G10H 2220/455* (2013.01)

(58) Field of Classification Search
CPC .................................................. G09B 15/023
USPC ........................................................ 84/478
See application file for complete search history.

(56) References Cited

U.S. PATENT DOCUMENTS

| | | | | |
|---|---|---|---|---|
| 5,982,343 | A * | 11/1999 | Iba ..................... | G02B 27/0172 |
| | | | | 345/8 |
| 8,445,767 | B2 * | 5/2013 | Brow .................... | G09B 15/02 |
| | | | | 84/478 |
| 2010/0307319 | A1* | 12/2010 | Kani ....................... | G10G 1/02 |
| | | | | 84/485 R |
| 2013/0083301 | A1* | 4/2013 | Lee ....................... | G03B 21/28 |
| | | | | 353/99 |

FOREIGN PATENT DOCUMENTS

| | | |
|---|---|---|
| CN | 202917045 U | 5/2013 |
| CN | 103778821 A | 5/2014 |
| CN | 203422918 U | 5/2014 |
| CN | 203773930 U | 8/2014 |
| CN | 203931243 U | 11/2014 |
| CN | 102842251 B | 12/2014 |
| CN | 104217625 A | 12/2014 |
| CN | 104240556 A | 12/2014 |

* cited by examiner

*Primary Examiner* — Jianchun Qin
(74) *Attorney, Agent, or Firm* — James M. Smedley LLC; James Michael Smedley, Esq.

(57) ABSTRACT

The present application generally relates to guidance systems configured to assist individuals in learning to play a piano. Specifically, the invention relates to a system for projecting animated guidance onto the keys of a standard piano, with such system being controlled by a computing device directing the speed, tempo, location and other aspects of displaying such guidance. Further embodiments of the invention also provide for the system projecting graphical images onto the keys of the piano to assist with note association.

2 Claims, 14 Drawing Sheets

GUIDANCE SYSTEM FOR LEARNING TO PLAY PIANO

CROSS REFERENCE TO RELATED APPLICATIONS

The present application claims priority to provisional application No. 62/099,782, entitled, "A Piano Learner's Guidance System", filed on Jan. 5, 2015, the contents of which are incorporated by reference herein in their entirety.

FIELD OF THE INVENTION

The present application generally relates to guidance systems configured to assist individuals in learning to play a piano. Specifically, the invention relates to a system for projecting animated guidance onto the keys of a standard piano, with such system being controlled by a computing device directing the speed, tempo, location and other aspects of displaying such guidance. Further embodiments of the invention also provide for the system projecting graphical images onto the keys of the piano to assist with note association.

BACKGROUND

Piano is one of the most difficult musical instruments to learn and to master. Beginning students often struggle as several skills need to be mastered in order to play even simple pieces fluently. Among others, three such difficulties presented in learning piano are: (1) knowing which keys are represented by notes printed on sheets; (2) memorizing and playing key sequences to the rhythm correctly; and (3) playing simultaneously while reading notes.

These difficulties, among others, tend to discourage new learners, many of whom eventually quit prematurely. Many services and products are designed to help ease some of these difficulties. For example, there are an abundance of piano teachers, books, video-based and software-based instructional materials that seek to alleviate the first difficulty by providing the background knowledge needed to start playing.

Most early stage piano learners quickly become frustrated due to the large number of mistakes made before even a short segment is memorized. As a result, several hardware products have been commercialized to help with this second difficulty. For example, U.S. Pat. No. 8,525,011 B2, as well as a number of prior patents it cites, describe devices, both standalone and those integrated into digital or acoustic keyboards, that guide learners by using lights, usually LEDs mapped to standard keys to indicate which keys are to be pressed. Chinese Patent No. CN202917045U and CN103778821A describe similar devices with some variations. All similar products rely on some sort of object placed or mounted on a piano keyboard, with a plurality of lights to provide guidance.

Finally, separate software products are available to help learners associate notes with their corresponding keys. Usually, these products take the form of simple games. When the user hits a correct key associated with a note or a set of notes displayed on the screen, an objective is achieved in the game. Conversely, if the user fails to strike the correct key, an error mark is displayed.

All such products and hardware devices do provide their intended benefits. For example, by following LED indicator lights on hardware assistance devices, the chances of pressing incorrect keys are greatly reduced, and therefore the frustration that comes along. However, several areas can be improved: (1) while services and products that provide instructions are tremendously useful, they do little to ease learners' frustration in repeatedly playing sequences incorrectly; (2) most hardware devices include a separate object placed on the piano keyboard, which can become a distraction as it covers parts of the keyboard; (3) all devices with indicator lights create a reliance on the lights themselves. Therefore, although learners avoid making mistakes, they tend to play by following the lights instead of trying to memorize the key sequences to play without any assistance, which is the eventual goal. Most devices and their accompanied software, if any, lack the intelligence to steer learners from following to memorizing the intended key sequences; and (4) all software based instructional products and hardware based assistance devices are designed to relieve learners from translating notes to their corresponds keys, which is a skill that every piano player need to master eventually.

Above all, other than human teachers, there is not a product currently available that unifies the benefits of all such products listed above and at the same time address the shortcomings of each individual type of products.

Therefore there is a need in the art for a system and method for assisting individuals in learning how to play the piano without creating a reliance on hardware or lighting devices placed on the keyboard of the piano and without limiting the individual's exposure and learning of the notes associated with each key.

SUMMARY OF THE INVENTION

Accordingly, embodiments of the present invention provide a system that comprises three features which address the shortcomings found in the prior art. These features are: (1) a projector, similar to video projectors or laser show projectors, being used to project animated guidance onto a piano keyboard (e.g., standard size piano keyboard); (2) a microprocessor, such as found in a tablet PC, desktop PC, laptop PC, mobile or embedded devices, and software to direct the microprocessor to, among other things, control the projector to: (a) administer an adaptive guidance method to automatically adjust display speed, pace and contents of projections onto the piano keyboard based on user's detected skill level; and/or (b) project an image of the notes being played alongside key indicators to promote mental associations between notes and their corresponding keys; and (3) a key press detection system to detect the user's key press accuracy and timing.

Accordingly, embodiments of this system simultaneously addresses all three learning difficulties identified in the background above. The system provides the necessary instructions and background information to the learner, either via the projector system or a separate computer communicatively connected to the system. The adaptive guidance method utilizes the projection device to both reduce mistakes and guide the user to memorizing key sequences more efficiently. Finally, projecting notes alongside key indicators facilitates a mental association between the two.

Embodiments of the system also addresses most shortcomings of currently available hardware and software products. For example, by using a projection technique, nothing needs to be mounted on the piano keyboard to divert the user's attention. The adaptive algorithm not only reduces key press mistakes and the frustration that comes along, but will also be designed to facilitate memorization. Images capable of being projected far exceeds simple LED indicators, finger patterns, notes and games being a few examples. Finally, notes can be learned at the same time.

While there are several variations and configurations described herein, preferred embodiments of the system comprise three principle parts, and may further comprise two other optional devices. The three principle parts are: (1) an image projection apparatus that projects an image to the piano keyboard, (2) a microprocessor, such as found in a tablet PC, desktop PC, laptop PC a mobile device or an embedded device, and software to direct the microprocessor to perform functions required by the system in performance of the adaptive guidance method, and (3) a key press detecting system that detects which key(s) are pressed. The other two optional devices are: (1) a digital or an acoustic (vertical or grand) piano with standard sized keys or a keyboard with non-standard keys; and (2) a separate computing device (e.g., tablet PC, laptop, desktop PC, smartphone, processor or other computing components integrated into the image projection apparatus). One of ordinary skill in the art would appreciate that there are numerous configurations that could be utilized with embodiments of the present invention, and embodiments of the present invention are contemplated for use with any appropriate configuration.

According to an embodiment of the present invention, an image projection apparatus is similar in structure to a desk lamp with adjustable arms. In certain embodiments, the image projection apparatus is placed on a flat area behind the keyboard of the piano. For instance, on a vertical acoustic piano, it can be placed atop the vertical cabinet, and the arms can be adjusted to lower the projection unit to a suitable distance above the piano keyboard. The image projection apparatus is controlled by the microprocessor and control software to project a variety of images, principally key indicators and notes.

According to an embodiment of the present invention, the microprocessor and control software will reside in a computing device, such as a tablet computer, and will primarily: (1) communicate with the image projection apparatus via a wired or a wireless connection and provide instructions on what to project; (2) display sheet music and relevant instructions on a display element of the computing device and highlight the notes being practiced; and (3) for each user selectable segment, provide guidance to the user by: (a) demonstrating the segment via either a piano that supports the Musical Instrument Digital Interface (hereafter "MIDI") or via the computer's speakers, with adaptive speeds, slowing down when struggling is detected and speeding up to the supposed rhythm when progress is detected; (b) for each set of notes, instructing the hardware to project indicators on the key(s) that ought to be played and the corresponding notes nearby, and waiting for the user to play; (c) continually adjusting the demonstration and expected playback speed as described in (a), and repeating steps (a) and (b); (d) increasingly dimming the key indicators while repeating Steps (a) and (b) when the user reaches certain proficiency level; and (e) finally, turning off the key indicators altogether while leaving the notes projected to facilitate memorization of the key sequence being practiced and association between notes and their corresponding keys.

While certain embodiments of the present invention may provide for the computing device to be a tablet computer or other similar computing device, other embodiments of the present invention may encapsulate the computing device inside or integrated with the image projection apparatus, such that the image projection apparatus is standalone system for providing the features and methods described herein. Further, a separate computing device may optionally be used to display the score. One of ordinary skill in the art would appreciate there are numerous configurations of such standalone image projection apparatus with associated computing device that could be used with embodiments of the present invention, and embodiments of the present invention are contemplated for use with any such configurations.

According to an embodiment of the present invention, a key press detecting system will poll the piano via a MIDI connector if the piano supports it. For pianos that do not feature a MIDI connection, a detecting system, selected from the group comprising an optical, thermal (infrared), or another type of motion detection system will be used to detect key presses or the user's hand and finger movements. The computing device will be used to analyze feedback from the detecting system to determine which keys are pressed.

According to an embodiment of the present invention, a guidance system for learning to play a piano comprises: an image projection apparatus configured to project images onto a keyboard of said piano, wherein said image projection apparatus is configured to be communicatively connected to a computing device comprising a microprocessor, a non-transitory memory storing computer readable instructions configured to control said image projection apparatus such that said image projected onto the keyboard of said piano change in response to actions taken on said keyboard by an individual playing the piano.

According to an embodiment of the present invention, the image projection apparatus further comprises: a projection unit, which contains a plurality of components capable of projecting an image to said keyboard; a mechanical structure that can be adjusted at least in its elevation; and a means of connecting said projection unit to said mechanical structure which allows the position of said projection unit in relation to said keyboard of said piano, whereby the image projected by said projection unit can be adjusted to match the size, shape and position of said piano keyboard.

According to an embodiment of the present invention, the projection unit further comprises: a light source; a transmissive image forming apparatus; and a means of directing light generated from said light source through said transmissive image forming apparatus, and projecting the resulting image to said keyboard.

According to an embodiment of the present invention, the projection unit further comprises: a light source; and a reflective image forming apparatus; and a means of directing light generated from said light source through said reflective image forming apparatus, and projecting the resulting image to said keyboard.

According to an embodiment of the present invention, the projection unit further comprises: two light sources; a transmissive image forming apparatus; a means of directing light generated from the first of said light sources through the upper part of said transmissive image forming apparatus, and projecting the resulting image to a first half of said keyboard; and a means of directing light generated from the second of said light sources through the lower part of said transmissive image forming apparatus, and projecting the resulting image to the second half of said keyboard.

According to an embodiment of the present invention, the projection unit further comprises: two light sources; a reflective image forming apparatus; a means of directing light generated from the first of said light sources through the upper part of said reflective image forming apparatus, and projecting the resulting image to a first half of said keyboard; and a means of directing light generated from the second of said light sources through the lower part of said reflective image forming apparatus, and projecting the resulting image to the second half of said keyboard.

According to an embodiment of the present invention, the projection unit further comprises: a light source; a transmissive image forming apparatus; a means of directing light generated from said light source through said transmissive image forming apparatus to form said image; a means of directing the upper half of said image to a first half of said keyboard; and a means of directing the lower half of said image to a second half of said keyboard.

According to an embodiment of the present invention, the projection unit further comprises: a light source; a reflective image forming apparatus; a means of directing light generated from said light source through said reflective image forming apparatus to form said image; a means of directing the upper half of said image to a first half of said keyboard; and a means of directing the lower half of said image to a second half of said keyboard.

According to an embodiment of the present invention, a key press detecting system capable of detecting key on said keyboard that are pressed by said individual playing said piano; and a means of controlling said image projection apparatus and said key press detecting system, wherein said means of controlling said image projection apparatus is configured to: (1) provide, through said image projection apparatus, a guidance to said user on which one or more keys on said keyboard to press at specific times and for specific durations; (2) recognize, via said key press detecting system, key presses said individual makes and a specific time and specific duration of said key presses; and (3) adjust said guidance variably according to an accuracy of said key presses in relation so said guidance.

According to an embodiment of the present invention, the guidance further comprises images of notes corresponding to said one or more keys to press at specific times and specific durations.

According to an embodiment of the present invention, the guidance adapts accordingly to said individual's pace of learning.

According to an embodiment of the present invention, the key press detecting system comprises a means of polling key press information from a MIDI interface provided by said keyboard or piano when said keyboard or piano supports said MIDI interface and allows said polling of key press information.

According to an embodiment of the present invention, the key press detecting system is integrated with said image projection apparatus and further comprises: an image capture device, such as a charge-coupled device (CCD), and/or a depth sensing system; a means for directing light reflected from said keyboard or movement of said user's hands to said image capture device and/or said depth sensing system; and a means for determining one or more keys pressed by analyzing data captured by said CCD and/or said depth system.

According to an embodiment of the present invention, the key press detecting system is a device attached to a computing device with a built-in camera, comprising: a means of directing light reflected from said keyboard to said built-in camera of said computing device; and a means of determining one or more keys pressed by analyzing images captured by said built-in camera.

According to an embodiment of the present invention, the system further comprises a demonstration system capable of playing a demonstration of a segment of a piano piece which is being practiced by said individual.

According to an embodiment of the present invention, the demonstration system comprises a means of controlling said keyboard through a MIDI interface wherein said piano supports control through said MIDI interface.

According to an embodiment of the present invention, the demonstration system comprises: a computing device with built-in or externally connected loud speakers, and a means of controlling said computing devices with said loud speakers.

According to an embodiment of the present invention, a projection system capable of projecting images of a higher aspect ratio than is provided by its image forming apparatus comprises: a light source; a transmissive or a reflective image forming apparatus of a nominal aspect ratio; a means of directing light generated from said light source through said transmissive or reflective image forming apparatus to form an image; a means of directing the upper half of said image to form a first half of a final projected image; and a means of directing the lower half of said image to form a second half of said final projected image, whereby said image projection system allows a projected image of about twice the aspect ratio provided by said transmissive or reflective image forming apparatus.

According to an embodiment of the present invention, a projection system capable of projecting images of a higher aspect ratio than is provided by its image forming apparatus comprises: two light sources; a transmissive or a reflective image forming apparatus of a nominal aspect ratio; a means of directing light generated from the first of said light sources through the upper part of said transmissive or reflective image forming apparatus to form a first half of a final projected image, and a means of directing light generated from the second of said light sources through the lower part of said transmissive or reflective image forming apparatus to form a second half of said final projected image.

According to an embodiment of the present invention, a method for providing piano learning guidance comprises the steps of: providing a non-volatile memory capable of storing a set of instructions; providing a microprocessor and a dynamic non-transitory memory configured to read said set of instructions from said non-volatile memory and executing them; providing a means for said computer processor to communicate with said image projection apparatus to send commands to control said image projection apparatus to project desired images; providing a means for said computer processor to communicate with said key press detecting system to collect information on keys pressed by an individual playing a piano; providing said computer processor executing said set of instructions such that said instructions cause said image projection apparatus to project said guidance to a keyboard of said piano in order to instruct individual to play keys at specific times and for specific durations; collecting information from said key press detecting system to determine keys pressed by said individual at specific times and for said specific durations; and causing said image projection apparatus to revise said guidance variably based on keys pressed by said individual, whereby revision is based on a pace of learning and progress by said individual.

According to an embodiment of the present invention, a projection apparatus for altering an aspect ratio of a projected image comprises: a projector light engine; and two mirrors, with a first mirror placed on top of a second mirror, wherein said first mirror is placed and angled such that it redirects a first half of an image generated by said projector light engine to a first half of an intended display area, and wherein said second mirror is placed and angled such that it redirects a second half of the image generated by said projector light engine to a second half of said intended display area, whereby the projection apparatus allows said projector light engine with a nominal aspect ratio to illuminate the intended display area with an aspect ratio greater than an aspect ratio originally projected by said projector light engine without being placed excessively high above said display area, which would cause much of the projected image to fall outside of said intended display area and the brightness of the projected image to decrease significantly.

According to an embodiment of the present invention, the projection apparatus further comprises a third mirror configured to redirect said image directed by said first mirror towards the first half of said intended display area, and a fourth mirror which redirects said image directed by said second mirror towards the second half of said intended display area, whereby the redirected image is aligned with said intended display area.

According to an embodiment of the present invention, the projection apparatus further comprises a fifth mirror which redirects said image from said projector light engine towards said first and second mirrors, whereby said fifth mirror enlarges said image produced by said projector light engine without significantly increasing the distance between said projector light engine and said first and second mirrors, which helps reduce possible defects introduced due to manufacturing tolerances in aligning said first and second mirrors.

According to an embodiment of the present invention, a method of transforming an image of a transmissive or a reflective image forming apparatus with a nominal aspect ratio into a projected image of a higher aspect ratio capable of covering a piano keyboard, comprises the steps of: providing one or more light sources; providing a transmissive or reflective image forming apparatus; providing a means of directing an upper part of an image produced by said one or more light sources and said transmissive or reflective image forming apparatus, and projecting said upper part of said image to a first half of a piano keyboard; and a means of directing a lower part of said image producted by said one or more light sources and said transmissive or reflective image forming apparatus, and projecting said lower part of said image to a second half of said piano keyboard.

The foregoing summary of the present invention with the preferred embodiments should not be construed to limit the scope of the invention. It should be understood and obvious to one skilled in the art that the embodiments of the invention thus described may be further modified without departing from the spirit and scope of the invention.

DETAILED DESCRIPTION

Figure 1:
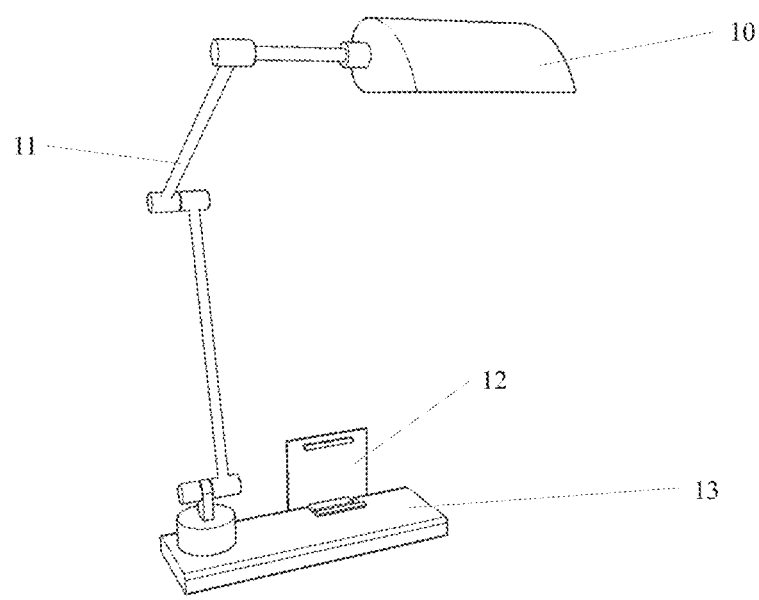
FIG. 1 is an illustration of an image projection apparatus, in accordance with an embodiment of the present invention.

FIG. 1 illustrations an exemplary embodiment of the image projection apparatus as described above. The device looks similar to a desktop lamp with four principle parts. The projection unit 10 contains electronic components, circuits, a light source or a plurality of light sources, an image source, optics and other mechanical structures needed to project an image to the keyboard. The adjustable arm 11 is designed so that the projection unit 10 can be adjusted at least vertically in order to fit a large number of digital and acoustic pianos. The tablet computer stand 12 can be flipped up (as shown in the figure) and down. In the up position, it can support a tablet computer in the upright portrait position. In the down position, a conventional monitor or a notebook computer can be placed in that location. The base 13 is a relatively heavy counterweight to stabilize the unit. It may contain some components or connectors.

Figure 2:
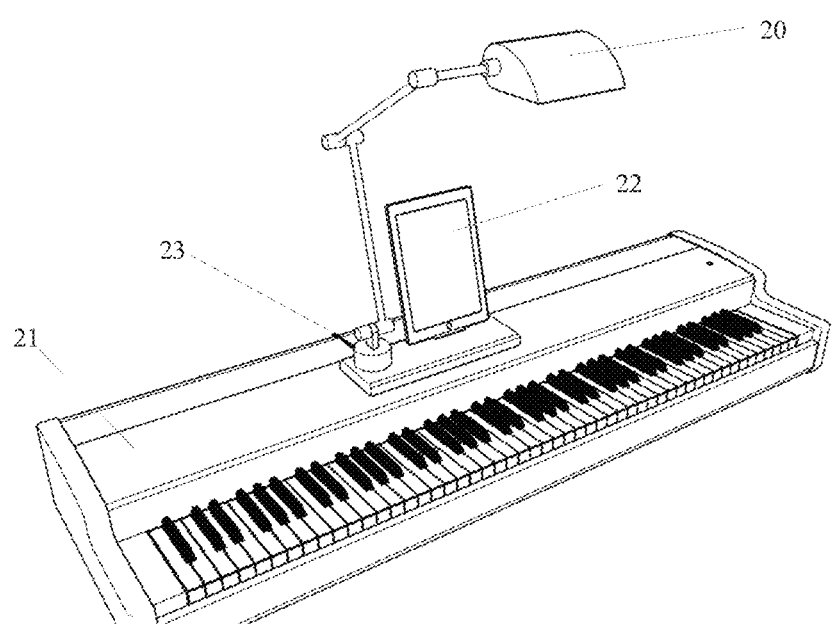
FIG. 2 is an illustration of an image projection apparatus and computing device as situated on a piano, in accordance with an embodiment of the present invention.

Turning now to FIG. 2, an illustration of an exemplary embodiment of the system as it is operated is shown. The image projection apparatus 20 is placed securely on a flat part of a piano 21 behind the keyboard. The figure shows a digital piano 21 but the arms can also be adjusted to fit an acoustic vertical or a grand piano. A tablet computer 22 that contains the software sits at the base leaning against the tablet computer stand 12. The software communicates with the device via a wired (not shown in figure) or a wireless connection. For pianos that support the MIDI interface (most digital and some high end acoustic pianos), a MIDI cable 23, which is typically a USB cable but sometimes a USB to PS/2 adapter is needed for older pianos, connects the device to the piano.

Figure 3:
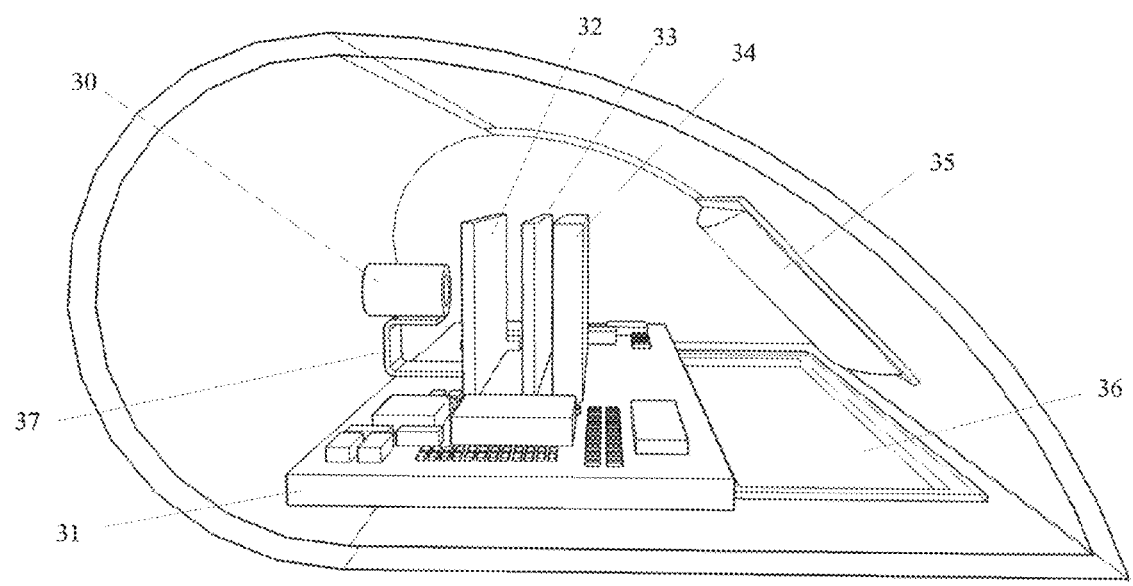
FIG. 3 is an illustration of an internal view of an image projection apparatus, in accordance with an embodiment of the present invention.

Turning now to FIG. 3, an illustration of the inside of a first embodiment of a projection unit 10 is shown, in accordance with an exemplary embodiment of the present invention. Other parts of the image projection apparatus are not shown. One or more printed circuit boards 31 (the figure shows only one) situated at the bottom of the enclosure contains electronic components, including processors, memories, lighting and LCD controls, etc. A light source 30 (e.g., collimated laser module) is raised by a simple mechanical structure 37 at the back, and placed before an optical diffuser 32, a Fresnel lens 33, and an LCD panel 34 or an equivalent transmissive image generating device. During operation, light beam generated by the laser module 30 is widened by the diffuser 32. Then, it is corrected by the Fresnel lens 33 to form a projection onto the LCD panel 34, which, controlled by the electronics, forms an appropriate image. The image then strikes a mirror 35, which can either be a panoramic or a flat mirror, depending on whether the image is wide enough to cover the entire keyboard. The mirror 35 is positioned at an angle, and redirects the images towards a window 36 at the bottom of the enclosure. The window 36 can be uncovered or covered by either a transparent screen or a Fresnel lens, depending on the width and the quality of the image. Depending on the image quality needed, all Fresnel lens may be replaced by regular lenses as needed.

Figure 4:
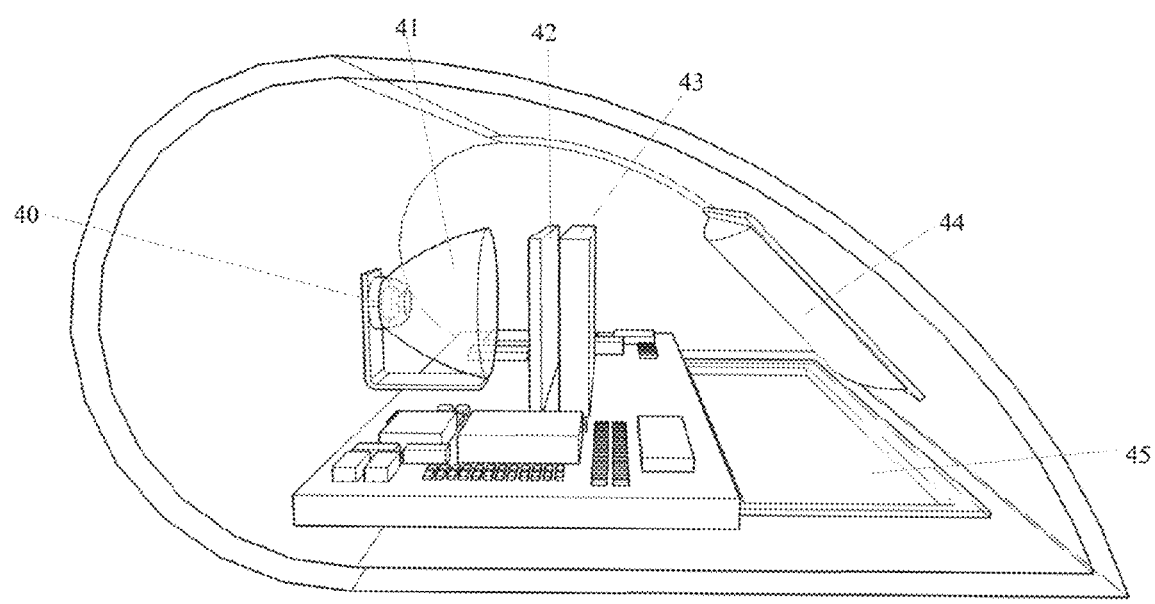
FIG. 4 is an illustration of an internal view of an image projection apparatus, in accordance with an embodiment of the present invention.

FIG. 4 illustrates a second embodiment of the projection unit, in accordance with an exemplary embodiment of the present invention. This embodiment is similar to the one shown in FIG. 3, but with the laser replaced by an LED or a plurality of LEDs 40 (only one shown in figure, light from multiple LEDs can be combined with appropriate optics). Optional collimator(s) 41 can be used to redirect most light towards the LCD panel 43. The collimator is shown in the FIG. 4 as being transparent, only to allow the LED to be visible. It is not necessary transparent in reality. A diffuser is not necessary, but a polarizer is needed to polarize light entering the LCD screen. Polarizers can be coated or affixed onto the LCD panel itself and is considered part of the LCD in the figure. Other elements, such as the Fresnel lens 42 before the LCD, the mirror 44, and the window 45, are similar to those shown in FIG. 3.

Figure 5:
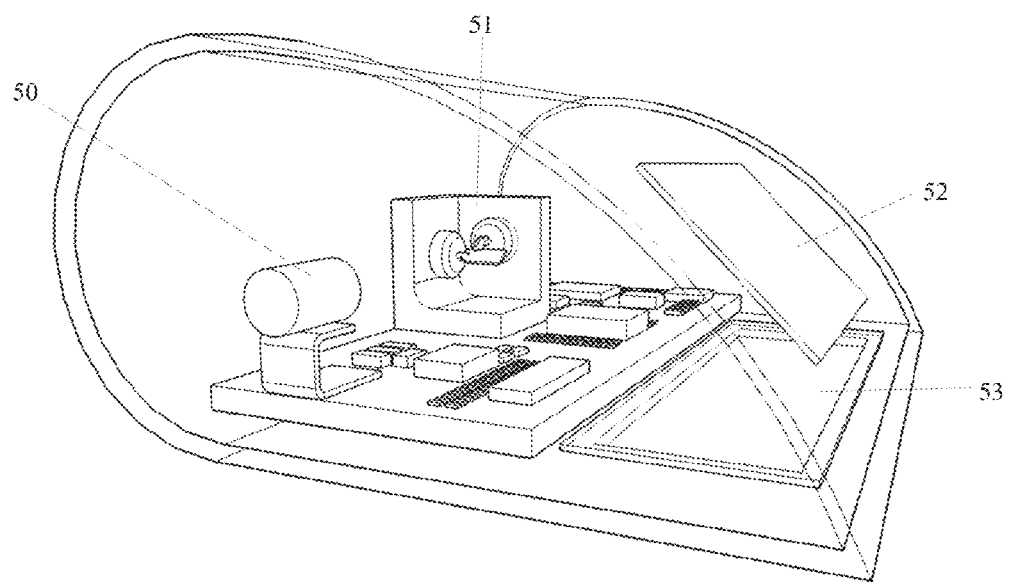
FIG. 5 is an illustration of an internal view of an image projection apparatus, in accordance with an embodiment of the present invention.

FIG. 5 illustrates a third embodiment of the projection unit, in accordance with an exemplary embodiment of the present invention. This embodiment includes a collimated laser module 50, which is similar to 30 but placed at a different location. The light beam from the laser is directed to an X-Y galvanometer 51 located in the center. By controlling the two mirrors that move at high speed, animated images can be formed. The images are directed towards a mirror 52 and window 53, similar to those shown in FIG. 3 and FIG. 4. Although the figure is shown with an X-Y galvanometer 51, a set of microelectromechanical (hereafter "MEMS") micro-mirrors can also be used in its place.

Figure 6:
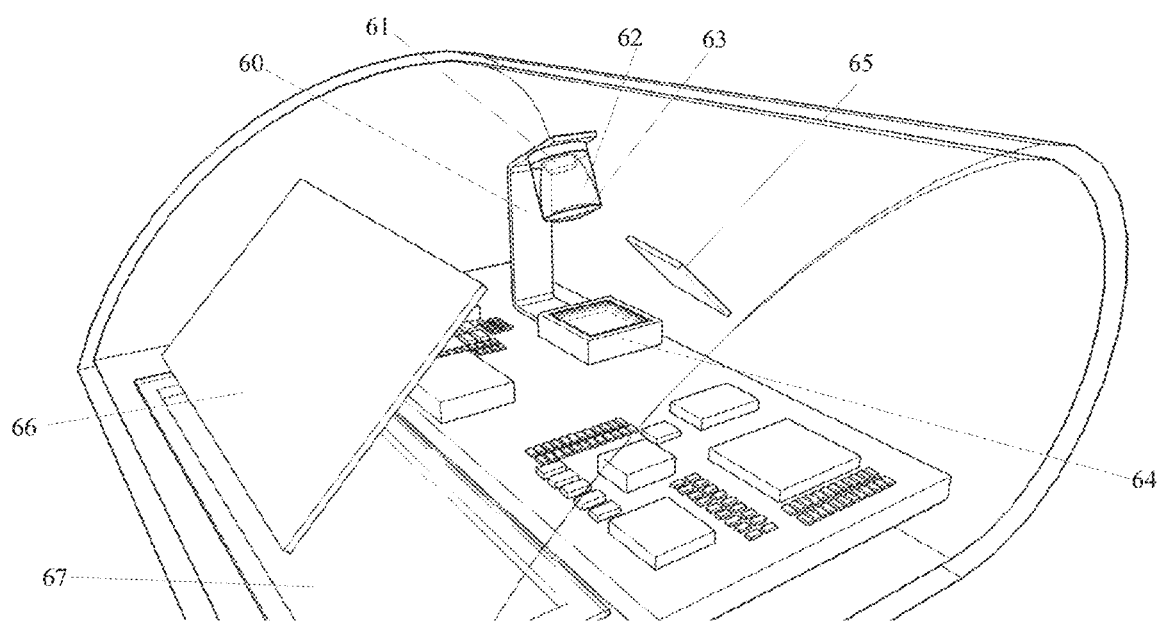
FIG. 6 is an illustration of an internal view of an image projection apparatus, in accordance with an embodiment of the present invention.

FIG. 6 depicts a fourth embodiment of the projection unit, in accordance with an exemplary embodiment of the present invention. This embodiment aims a light source, typically either laser(s) or LED(s) (one LED shown in the FIG. 61, at a digital micro-mirror device (hereafter "DMD") 64, either a digital light processing (hereafter "DLP") chip, a liquid crystal on silicon (hereafter "LCoS") chip, or an equivalent reflective image generating device, through a collimator 62 and a lens 63. The light reflected by the DMD forms an image, which is directed to a flat mirror 65, which in turn redirects the image to another mirror 66 above the window and through the window 67 to the keyboard below. In case the DMD is an LCoS chip, a polarizer is also needed. The polarizer, not shown in the figure, can be coated or affixed to the lens 63 or the DMD 64.

Figure 7:
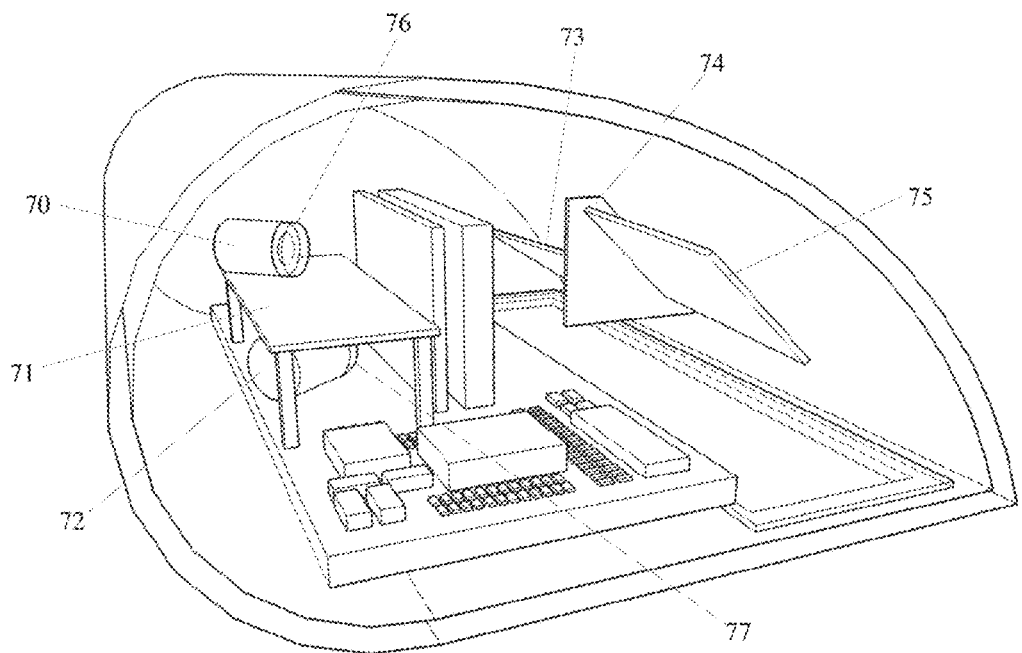
FIG. 7 is an illustration of an internal view of an image projection apparatus, in accordance with an embodiment of the present invention.

FIG. 7 depicts a fifth embodiment of the projection unit, in accordance with an exemplary embodiment of the present invention, which is a variant of the embodiments shown in FIG. 3 and FIG. 4. Although only lasers are shown as light sources, with simple modifications, LED(s) can also be used. The standard piano keyboard is long and narrow, typically with an aspect ratio of about 8.2:1. On the other hand, most common LCD panels have aspect ratios of 4:3 (1.33:1) or 16:9 (1.78:1). As a result, only a narrow strip of the pixels are needed in the narrower direction. This embodiment divides the LCD panel into the upper part and the lower part, with a light source illuminating each. Each illuminated image is redirected by a mirror to illuminate half of the piano keyboard. In the figure, Laser 1 70 illuminates the upper half of the LCD. It is angled so that the image reaches Mirror 1 75, which is positioned and angled to direct the image to the left half of the piano keyboard below. Similarly, Laser 2 72 illuminates the bottom half of the LCD. It is angled so that the image reaches Mirror 2 73, which is positioned and angled to direct the image to the other half of the piano keyboard. The optional light dividers 71 and 74, are sheets made of any non-transparent material that block light from one image path from crossing into the other. In case the light sources are lasers, as shown in the figure, a diffuser 76 and 77 is mounted to each module. In case the light sources are LED(s), not shown in the figure, a collimator similar to 41 may be needed, and the LCD panel will need to be coated or affixed with a polarizer.

Due to manufacturing tolerances, the left and right half of the projected images may have a slight offset from each other. The images redirected by mirror(s) placed at an angle will also have a distortion, similar to a keystone distortion but varies depending on the placement and orientation of the mirror(s). However, it is possible to compensate for the misalignment and distortion by adjusting the source image. The simplest method is to provide directional buttons that a user may press to make such adjustments. Another method requires a camera or another imaging device to record an image of the keyboard and a projected test pattern. By analyzing the test pattern's size, shape and position in relation to those of the image of the keyboard, an algorithm can be used to automatically correct for the misalignment and the distortion.

Figure 8:
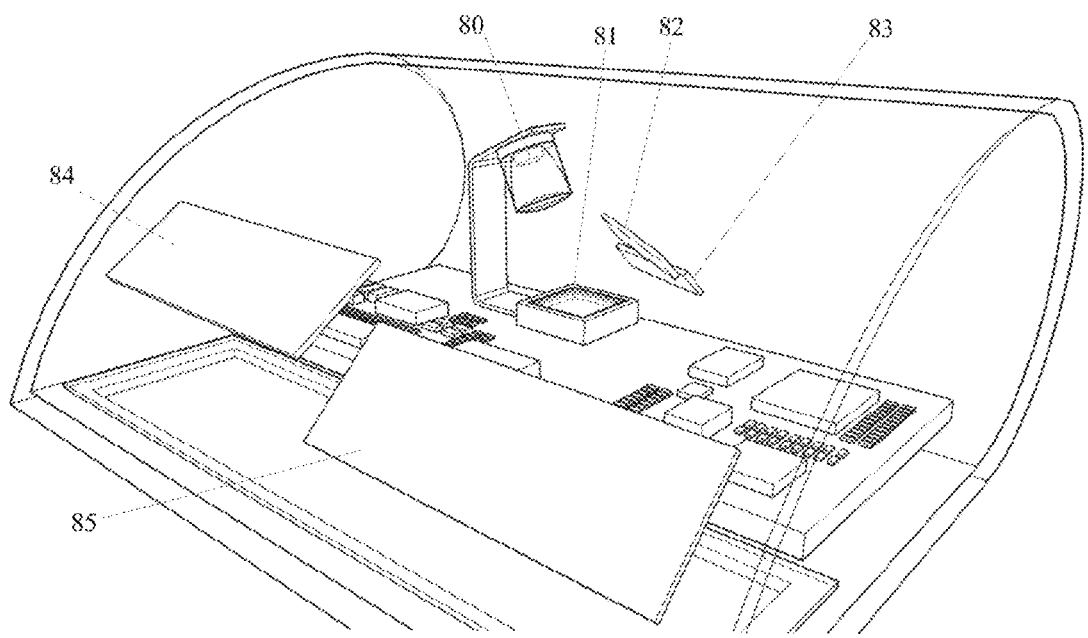
FIG. 8 is an illustration of an internal view of an image projection apparatus, in accordance with an embodiment of the present invention.

FIG. 8 illustrates a sixth embodiment of the projection unit, in accordance with an exemplary embodiment of the present invention, which is similar to the concept shown in FIG. 7 but uses a DMD chip instead of an LCD panel. However, since DMD chips are typically very small, using two light sources are not practical. Instead, the reflection mirror is split into two to separate the image from the top and bottom parts of the chip into two images. The pixels in the middle portion of the DMD chip are unused to avoid images crossing into the other half. In the figure, the same light source 80 and DMD 81 as those shown in FIG. 6 are used. Half of the image from the DMD is directed by Mirror 1a 82 to Mirror 2a 84 and to the left half of the piano keyboard below. The other half of the image from the DMD is directed by Mirror 1b 83 to Mirror 2b 85, and to the right half of the piano keyboard. This same split mirror concept can be applied to embodiments with an LCD panel, as shown in FIG. 3 and FIG. 4, with a different layout of the mirrors.

The first embodiment of the key press detecting system is shown as part of FIG. 2, in which a MIDI cable 23 connects the image projection apparatus 20 and the piano 21. In this embodiment, the system software polls the MIDI keyboard periodically to detect key presses. This embodiment only works with pianos that support the MIDI interface. The MIDI cable is typically a USB cable for newer pianos. However, it can also be a USB to PS/2 adapter for older pianos that only support PS/2 connectors. In the case when the piano supports the MIDI connection, the key press detecting system is the most accurate and effective, but other embodiments are also satisfactory for the intended purposes of the invention.

Figure 9:
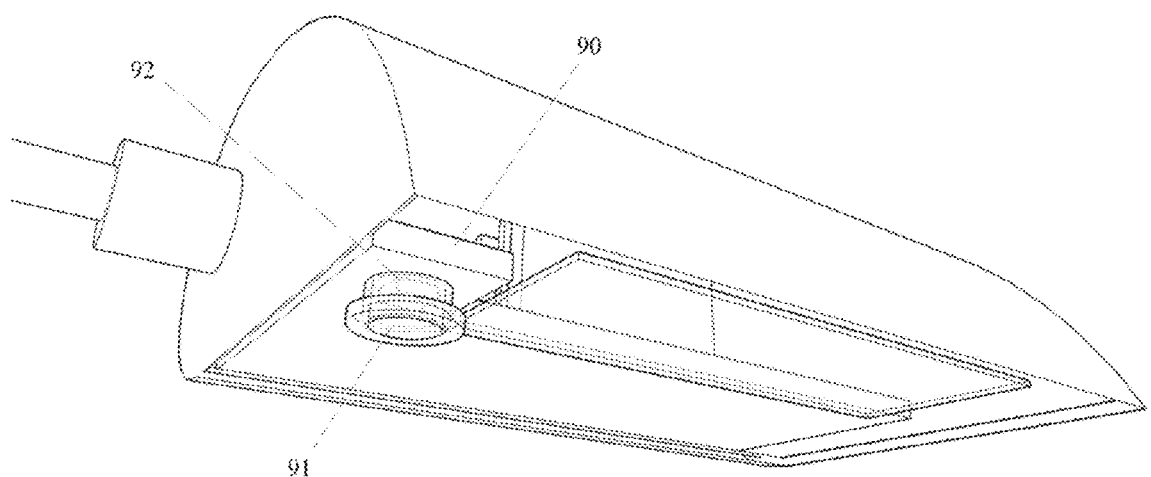
FIG. 9 is an illustration of a component of an image projection apparatus, in accordance with an embodiment of the present invention.

FIG. 9 depicts a second embodiment of the key press detecting system, in accordance with an exemplary embodiment of the present invention with the bottom part of the projection unit's housing removed to show its interior. In this embodiment, a camera is integrated into the projection unit 10. A charge-coupled device (hereafter "CCD") chip 92 is mounted at the bottom side of the printed circuit board 90. A fish-eye lens or a wide angle lens 91 may optionally be mounted on the same side over the CCD. The mechanical structure holding the fish-eye lens or wide angle lens are shown to be transparent in the figure only to illustrate the CCD chip inside. The actual structure will likely be opaque. A microprocessor chip and software configured to control the interaction therebetween, either integrated into the projection unit 10 or on the tablet computer 22, takes a picture of the piano keyboard and analyzes its light pattern (or otherwise senses or detects the light pattern). For instance, in one embodiment, the system analyzes an image of the keyboard and determines a small area on each key that has the highest light intensity of that key. Subsequently, the software monitors the said area on each key to detect movement, which is indicated by a rapid decline of the light intensity. A separate CCD camera or another form of position/depth detection system, such as thermal imagers, infrared light and sensor pairs, or Doppler motion detectors (not shown in figure), may also be used in place of the CCD or in addition to it to enhance detection accuracy. This is a preferred embodiment of the key press detecting system in cases where the piano does not support a MIDI connection, but other embodiments are also satisfactory for the intended purposes of the invention.

Figure 10:
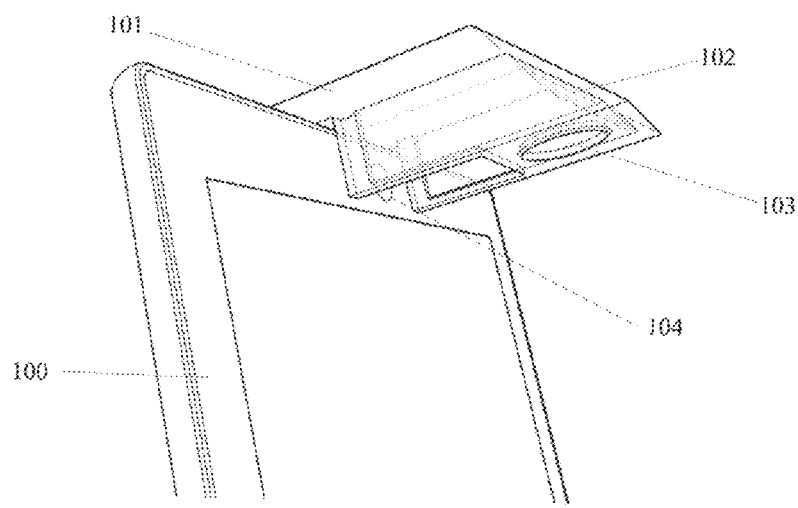
FIG. 10 is an illustration of a computing device and a key detector, in accordance with an embodiment of the present invention.

FIG. 10 shows a third embodiment of the key press detecting system, in accordance with an exemplary embodiment of the present invention. This embodiment requires a separate mechanical structure 101 that either clips onto or is otherwise mounted onto a computer's (a tablet computer is shown in the figure) 100 built-in camera 104. The mechanical structure is shown to be transparent in the figure only to show components it would otherwise block. The actual structure may be opaque. The structure optionally contains a lens 103, which can be a fish-eye or a wide angle lens to widen the field of view, and a flat mirror 102 mounted internally at an angle to direct light from the lens 103 to the computer's built-in camera 104. A software that resides in the computer, which can be a part of the control software that controls the piano learner's guidance system, performs similar tasks as described elsewhere herein.

Figure 11:
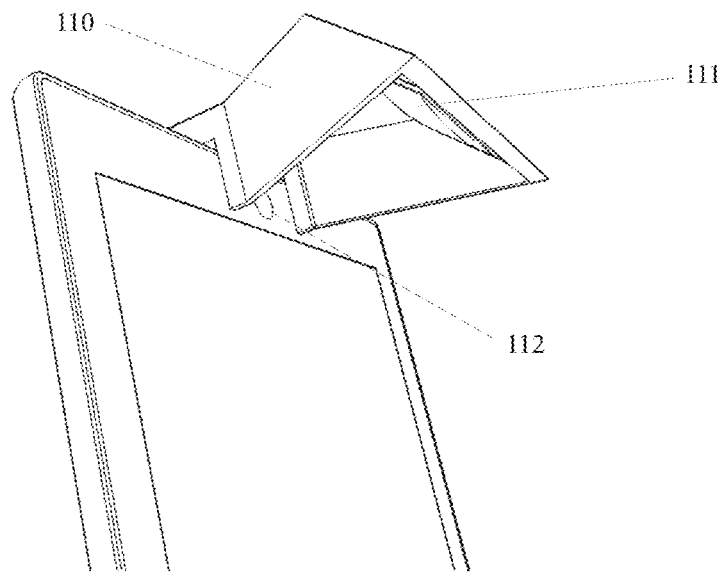
FIG. 11 is an illustration of a computing device and a key detector, in accordance with an embodiment of the present invention.

FIG. 11 depicts a fourth embodiment of the key press detecting system, in accordance with an exemplary embodiment of the present invention, which is a variant of the embodiment shown in FIG. 10. In this embodiment, instead of a lens 103 and a flat mirror 102, a horizontal panoramic mirror 111 is mounted in a similar mechanical structure 110 to direct light from the piano keyboard to the computing device's built-in camera 112. A software that resides in the computing device instructs the microprocessor of the computing device to perform the functions of the methodology as described elsewhere herein.

Figure 12:
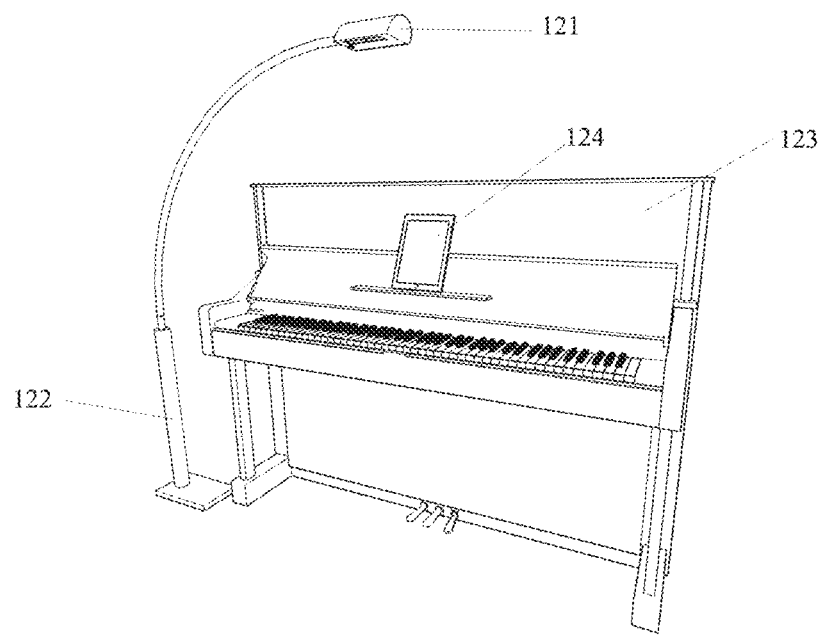
FIG. 12 is an illustration of an image projection apparatus and computing device, in accordance with an embodiment of the present invention.

FIG. 12 illustrates another embodiment of the system. The projection unit 121 is the same or similar to that shown in FIG. 2, but is mounted on a floor stand 122. The device is shown to be used in conjunction with an acoustic vertical piano 123 instead of a digital one. An optional computer or tablet computer 124 functions as described elsewhere herein.

Figure 13:
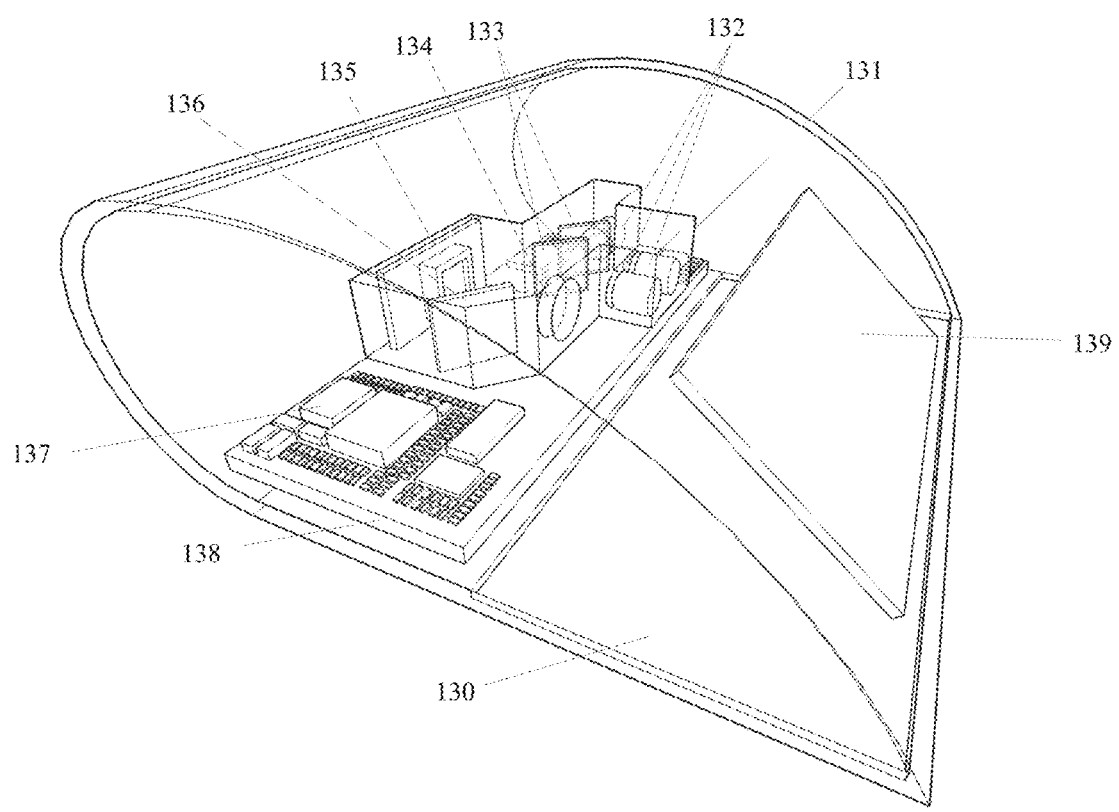
FIG. 13 is an illustration of an internal view of an image projection apparatus, in accordance with an embodiment of the present invention.

In numerous embodiments of the projection unit, as described herein, the projection unit projects images to the piano keyboard, which has an elongated aspect ratio (e.g., about 8.2:1), using a conventional low cost projector light engine. In one embodiment, a single mirror is used to redirect the image, shown in FIG. 13. The figure shows a conventional low cost projector light engine 131, typically comprising of a set of red, green and blue LED light sources 132, dichroic mirrors 133 to combine and channel the light, a reflective mirror 136 to re-direct the combined light, and an image generator 135, typically an LCD, DMD or a MEMS scanning mirror. If the image generator were an LCD, the construction of the light engine would be slightly different, as LCDs are transmissive instead of reflective as shown in the figure. The image formed by the light and the image generator is directed, amplified and focus by a set of lens 134, and projected. In this variation of the embodiment, a mirror 139 is used to redirect the projected image, which allows the light engine 131 to be positioned horizontally. Below the mirror is simply an opening or a piece of translucent material such as glass or polycarbonate 130 to allow the image to pass through. An alternate variation of this embodiment is to omit the mirror 139 and orient the projector light engine to point directly towards the keyboard. Either variation of this embodiment suffers from two important disadvantages: (1) unless the lens 134 is low throw and wide angle, which is typically heavy and very expensive, it is necessary to place the projector very high above the keyboard in order for the image to cover a useful region of it; this makes installation and adjustment inconvenient, and (2) due to the first requirement, unless the light sources have very high luminosity, which again would be heavy and costly, the image projected on the keyboard is usually very dim, and therefore unsuitable for usage under indoor daylight conditions.

Even with wide angle lens and high luminous projector engines, since the nominal aspect ratios of conventional projector light engines are so much smaller than that of a standard keyboard, at least half of the image falls outside of keyboard, and therefore is wasted, while the half that does fall on the keyboard is dim and pixelated due to the large distance.

Figure 14:
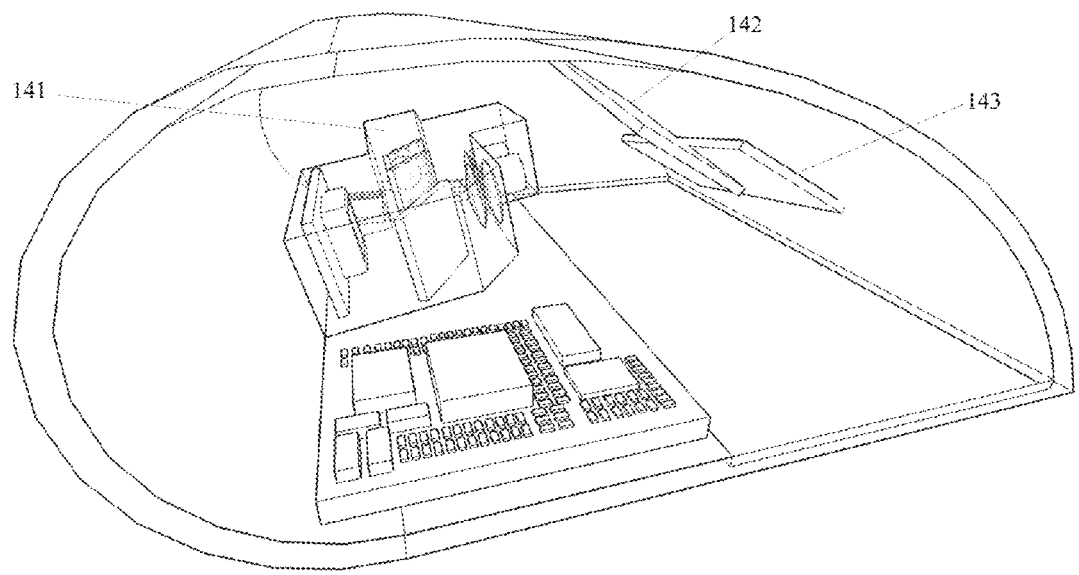
FIG. 14 is an illustration of an internal view of an image projection apparatus, in accordance with an embodiment of the present invention.
Figure 15:
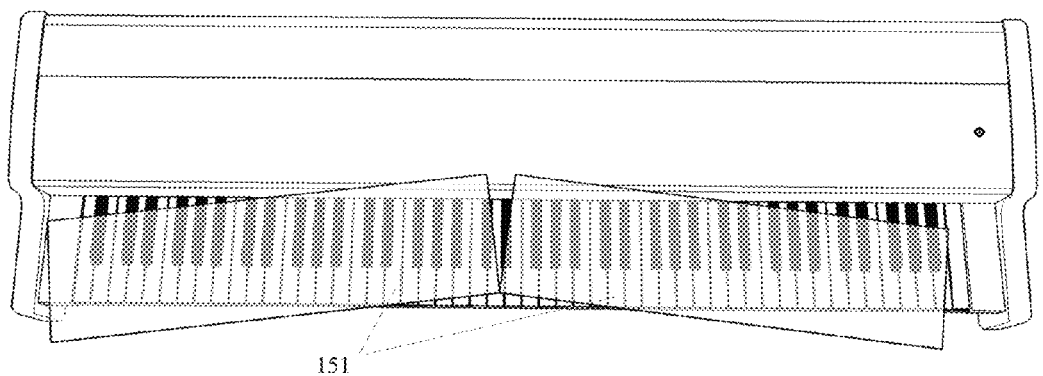
FIG. 15 is an illustration of a projected image on a piano keyboard, in accordance with an embodiment of the present invention.

Another embodiment of the present invention is shown in FIG. 14. This embodiment uses the same light engine 141, which is aimed at a set of split mirrors 142 and 143. The light engine is placed and angled such that the top half of the projected image fall onto the top split mirror 142, which directs it to one half (either the left or the right) of the keyboard depending on the mirror's orientation. Similarly, the bottom half of the image falls onto the bottom split mirror 143, which directs it to the other half of the keyboard. The light engine shown in the figure is tilted at an angle but this is not required. Alternatively, the angle of the split mirrors or the entire projection unit can be adjusted. This embodiment is a significant improvement over some other embodiments, in that the projected image is capable of covering nearly the entire keyboard while being placed at a much lower height above it, therefore increasing the light intensity of the images and reducing pixilation. However, it does suffer from a couple of shortcomings of its own: (1) first, the projected image is inverted (a mirror image); this is a minor inconvenience, as the computing unit which generates these images can easily invert the source, (2) second and more significantly, each of the two half images 151 are projected at an angle relative to the keyboard, as shown in FIG. 15; this requires the projecting unit to be placed higher than necessary, though still much lower than the previous embodiment, in order to cover the entire keyboard.

Figure 16:
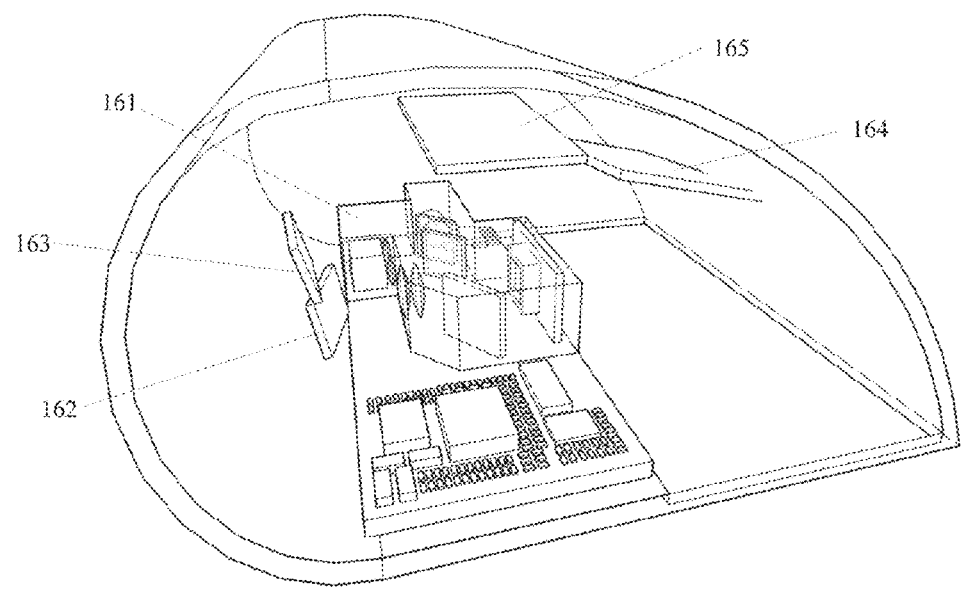
FIG. 16 is an illustration of an internal view of an image projection apparatus, in accordance with an embodiment of the present invention.

Another embodiment of the present invention seeks to address the shortcomings of the first two by adding another set of split mirrors, as shown in FIG. 16. This embodiment begins with a similar light engine 161, albeit facing the opposite direction. The image formed by the light engine is first split with a set of smaller mirrors 162 and 163 placed close to the lens. The two half images are directed to a set of bigger mirrors 164 and 165, which then redirects them to the keyboard. The small mirror at the bottom 162 redirects the bottom half of the image to its companion big mirror 164, which in turn redirects the half image to one half of the keyboard. Similarly, the small mirror at the top 163 redirects the top half of the image to its companion big mirror 165, which in turn redirects it to the other half of the keyboard. The resulting images projected onto the keyboard run parallel to the keyboard. They can easily cover the entire keyboard while the projector is placed at a reasonable height atop it. With a prototype constructed according to this embodiment, using a low cost mobile projector with relatively low luminosity (about 70 ANSI lumens), placing the apparatus at about 70-80 cm above a standard keyboard allows the image to cover most of the keyboard, while having sufficient intensity for indoor daylight usage. The images generated by this embodiment do have a distortion, similar to common keystone distortion both in the x- and y-directions. This distortion can be digitally corrected by the firmware which generates the images.

Figure 17:
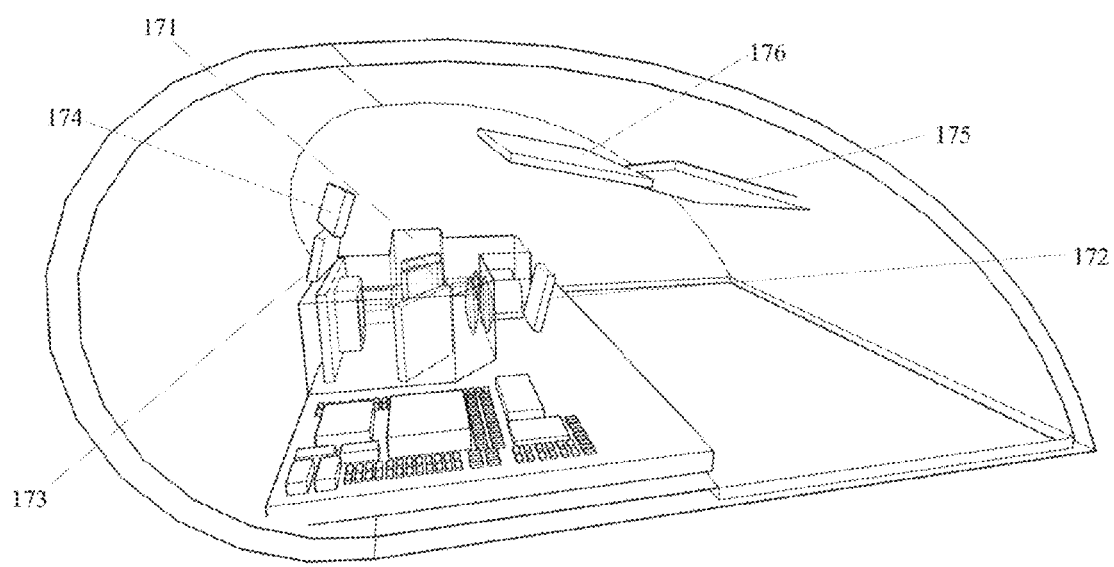
FIG. 17 is an illustration of an internal view of an image projection apparatus, in accordance with an embodiment of the present invention.

Another embodiment of the present invention is shown in FIG. 17. This embodiment inserts another mirror 172 in front of the lens of the light engine 171. Its purpose is to enlarge the image before it is split by the small split mirrors 173 and 174, so that the location of the split (usually around the middle of the image) is less sensitive to manufacturing tolerances in the placements of the small split mirrors 173 and 174. The same can be achieved in the previous embodiment by placing the small split mirrors 162 and 163 farther from the lens of the light engine 161. However, doing so will require more space and a bigger enclosure. This embodiment allows the enclosure to be more compact. On the other hand, the addition of a mirror does introduce more image distortion and reduces the projected light intensity slightly.

Figure 18:
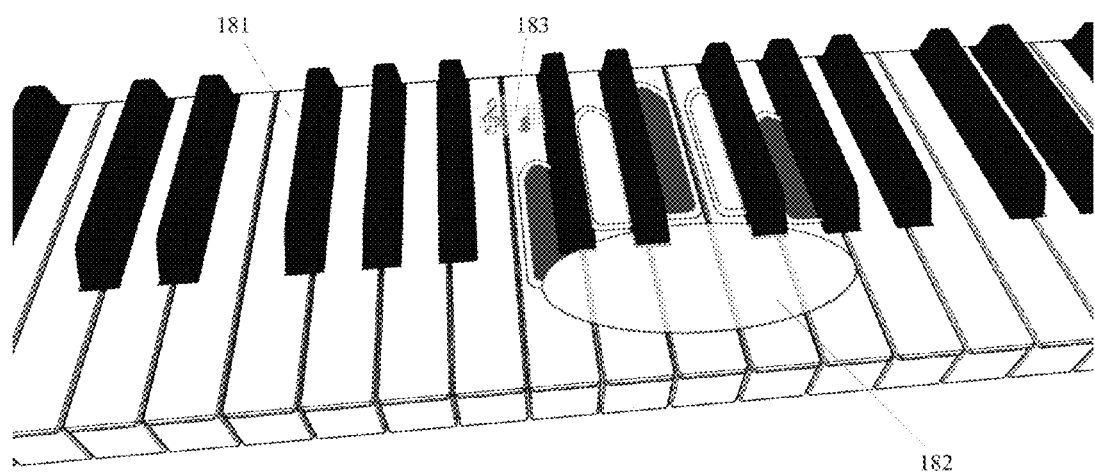
FIG. 18 is an illustration of a projected image on a piano keyboard, in accordance with an embodiment of the present invention.

FIG. 18 illustrates sample images that can be projected onto a keyboard 181. Instead of simple lighting as in LED based devices or keyboards with illuminated keys, key indicators can be projected in the shape of hands 182 to convey finger pattern. Further, the hand pattern can be easily animated to convey finger movement and to make the guidance more interesting. Notes and other information 183 can also be projected onto the keyboard to facilitate learning not only key sequences, but also other important musical skills such as note reading.

Figure 19:
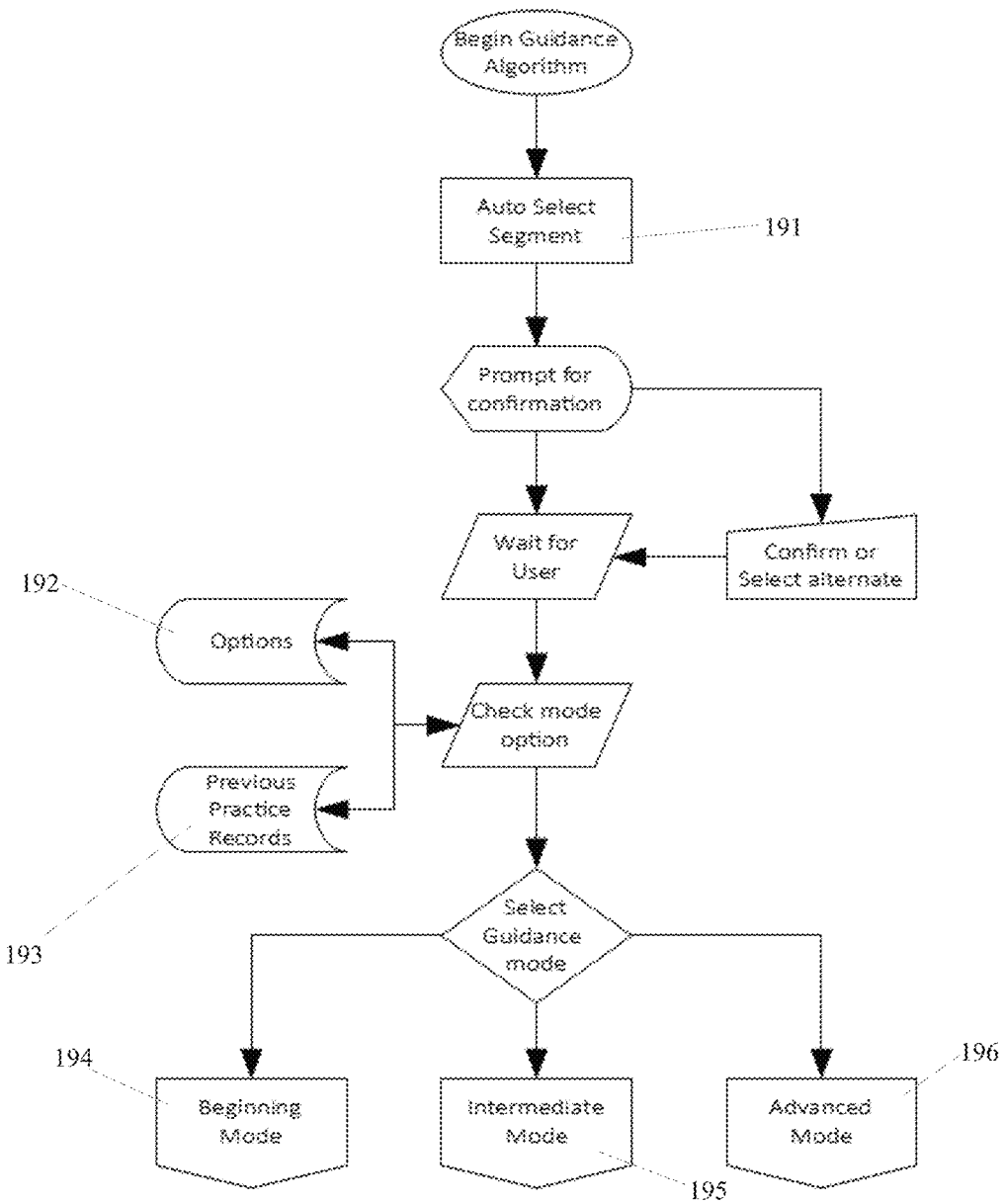
FIG. 19 is an exemplary process flow for an adaptive guidance method, in accordance with an embodiment of the present invention.

FIGS. 19-22 illustrate flow charts showing an exemplary embodiment of the guidance method described herein. For the purposes hereof, the method assumes that the user has already selected a piece of music to practice and has initiated the algorithm. FIG. 19 shows the beginning portion of the method, in which the system automatically selects a segment from the piece 191 after checking the stored user practice history 193, and waits for the user to either confirm or select a different segment. The system then checks stored preferences 192 and the user's practice history of this particular segment 193 to determine a most suitable mode to begin (beginning 194, intermediate 195, or advanced mode 196). For example, if the user has never practiced this particular segment previously, the system may be configured to automatically start in the beginning mode 194.

Figure 20:
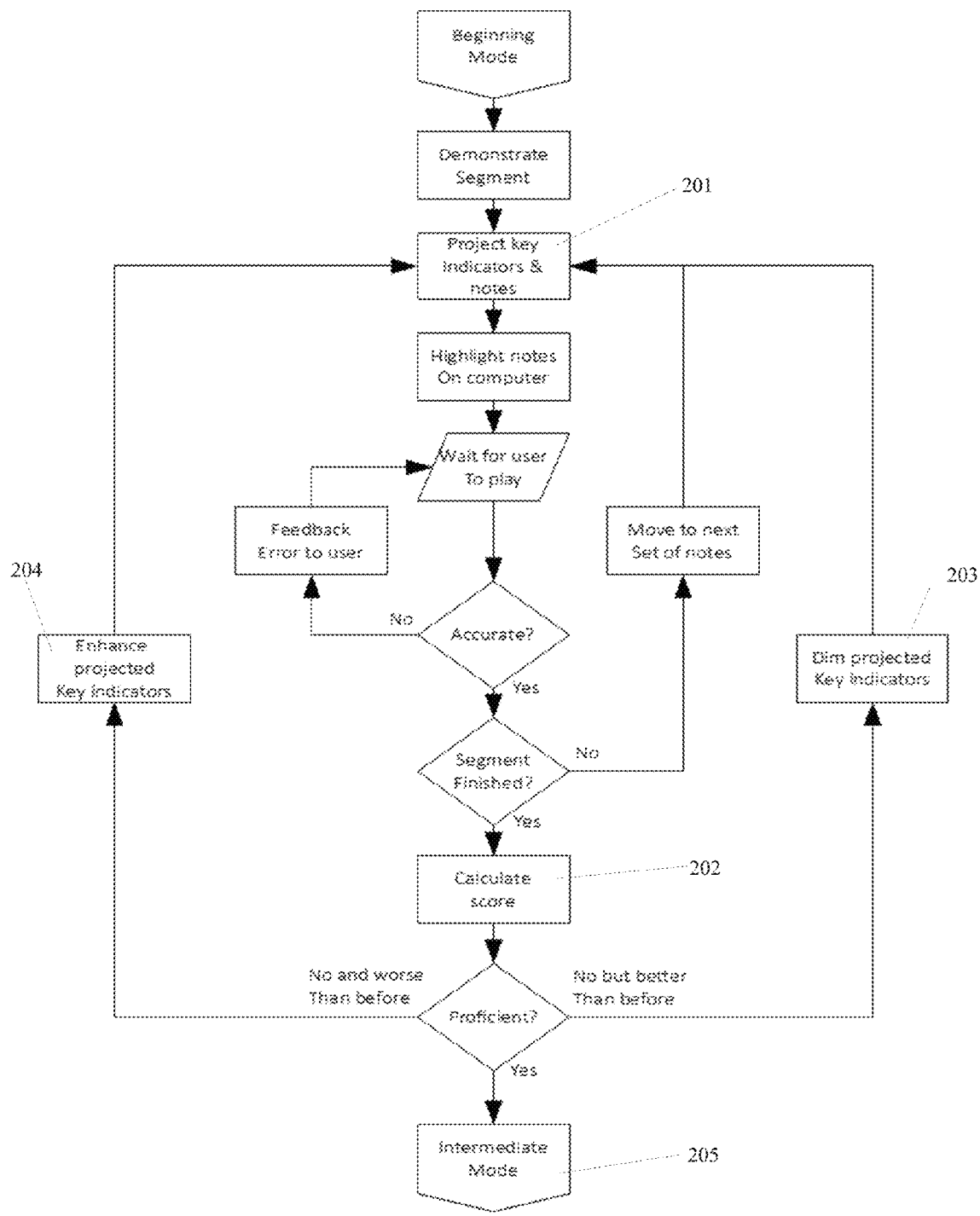
FIG. 20 is an exemplary process flow for an adaptive guidance method, in accordance with an embodiment of the present invention.

FIG. 20 is an illustration of the beginning mode. In this mode, the system projects guidance for every key or chord to the piano keyboard, along with notes or supplemental graphics and animations 201. Then the system monitors the user's key press activities and provides feedback when necessary. After the user finishes the segment, a scoring system calculates the user's proficiency and assigns a score 202. Then, the system either dims the projected key guidance 203 if the user has shown improvement, or enhances it 204 if the user's proficiency has decreased. If the user has played sufficiently proficiently, the system automatically moves to the intermediate mode 205.

Figure 21:
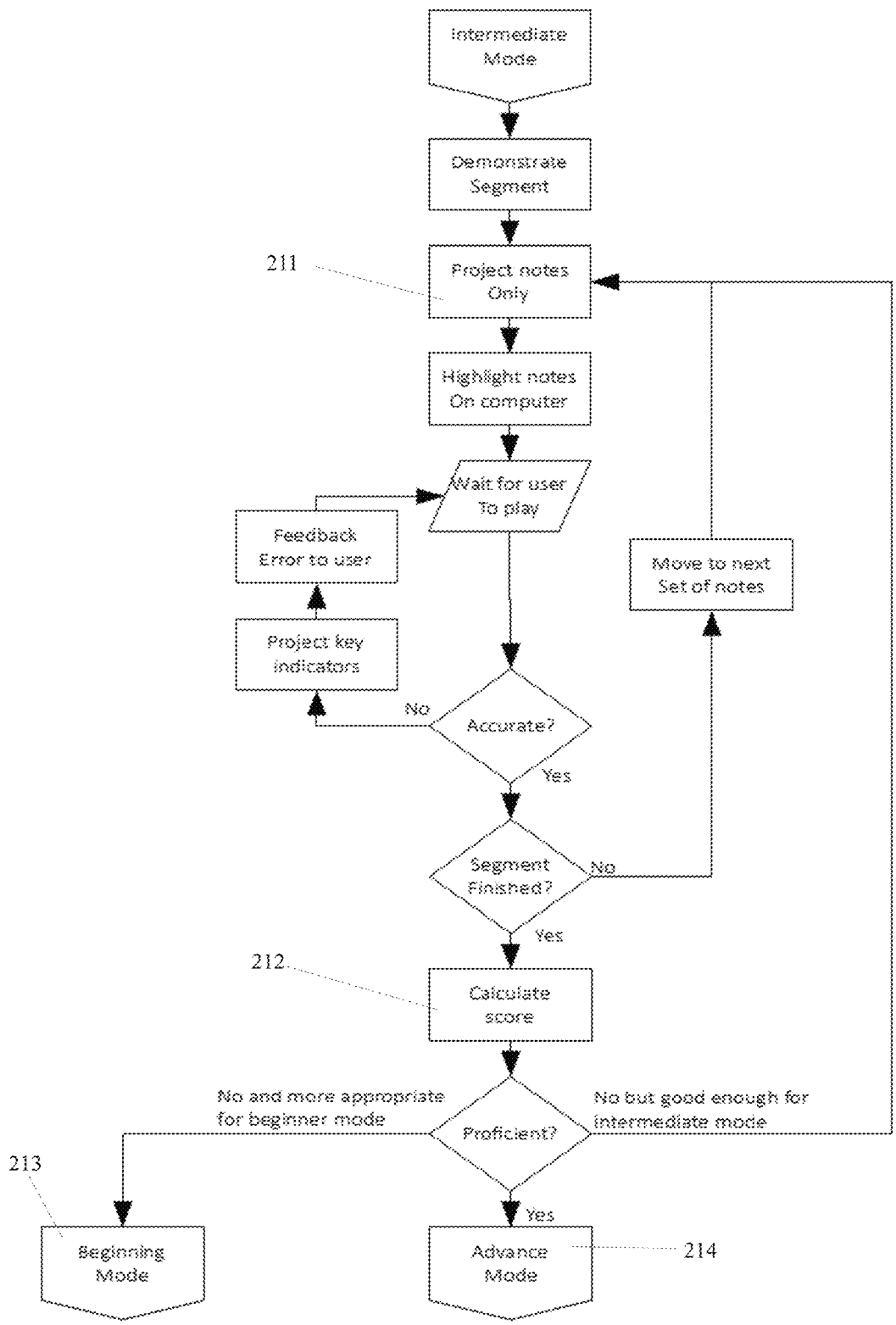
FIG. 21 is an exemplary process flow for an adaptive guidance method, in accordance with an embodiment of the present invention.

FIG. 21 is an illustration of the intermediate mode. In this mode, key guidance is not projected unless the user makes a mistake, but notes and other supplemental information can still be projected 211. After the user finishes the segment, a scoring system calculates the user's proficiency and assigns a score 212. Based on the score, and in comparison to the scores of previous rounds, the method can either: (1) rerun the intermediate mode, (2) return to the beginning mode if the user's proficiency level has decreased significantly 213, or (3) advance to the advance mode 214.

Figure 22:
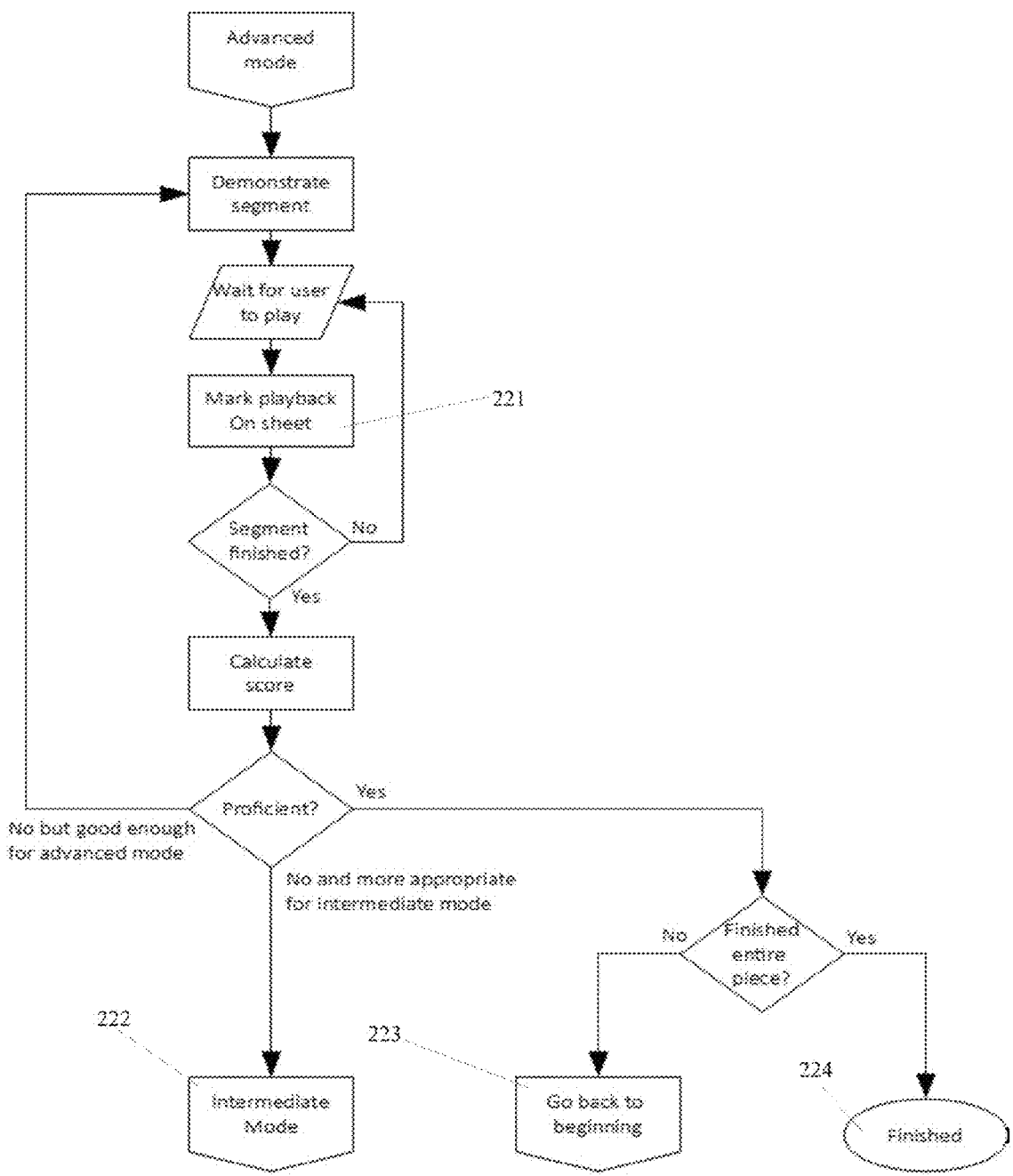
FIG. 22 is an exemplary process flow for an adaptive guidance method, in accordance with an embodiment of the present invention.

FIG. 22 is an illustration of the advance mode. In this mode, nothing is projected to the keyboard. However, the user's playback can be optionally superimposed in real time to the music score 221 being displayed on the separate tablet or notebook computer (22 or 124). If the user playback is optionally not displayed on the computer or tablet computer in real time, it can be displayed after the completion of the segment being practice. This provides a visual indication of the user's playback accuracy in comparison to the notes indicated in the score. Similar to the other modes, a scoring system calculates a score after each time the user completes the segment, and then determines the next step. Based on the score, the method can recommend either (1) restarting the advance mode, (2) returning to the intermediate mode 222 if the user proficiency level has decreased significantly, or (3) go back to the beginning of the algorithm 223 to select a new segment 191 if the user has been sufficiently proficient with the current segment. Finally, if the entire piece has been completed satisfactorily, the method is successfully completed 224.

REFERENCE NUMERALS

10 The projection unit
11 Adjustable arm
12 Tablet computer stand
13 Base
20 The image projection apparatus as shown in FIG. 1
21 Digital or acoustic piano
22 Tablet computer
23 MIDI cable (typically USB cables)
30 Laser light source
31 Printed circuit board with surface mounted components
32 Optical diffuser
33 Fresnel lens
34 LCD panel
35 Panoramic or normal flat mirror
36 Window with transparent thin sheet or Fresnel lens or simply an opening
37 Simple mechanical structure that raises the laser module
40 LED(s)
41 Collimator
42 Fresnel lens
43 LCD panel with polarizer
44 Panoramic or flat mirror
45 Window with transparent thin sheet or Fresnel lens or simply an opening
50 Collimated laser module similar to 30
51 X-Y galvanometer
52 Panoramic or flat mirror
53 Window with transparent thin sheet or Fresnel lens or simply an opening
60 Simple mechanical structure
61 Laser or LED light source(s)
62 Collimator
63 Lens
64 DMD such as DLP or LCoS
65 Flat mirror
66 Panoramic or flat mirror
67 Window with transparent thin sheet or Fresnel lens or opening
70 Laser module 1
71 Light divider
72 Laser module 2
73 Mirror 2
74 Light divider
75 Mirror 1
76 Optical diffuser
77 Optical diffuser
80 Light source similar to the combined structure of 61, 62, and 63
81 Digital micro-mirror device
82 Mirror 1a
83 Mirror 1b
84 Mirror 2a
85 Mirror 2b
90 Printed circuit board (PCB)
91 Lens, may be fish-eye or wide angle lens
92 CCD (Mounted on the bottom side of the PCB 90 and inside the lens 91)
100 Tablet computer
101 Mechanical structure that clips or mounts onto the tablet computer
102 Flat mirror (inside the mechanical structure 101)
103 Lens, may be fish-eye or wide angle lens
104 Tablet computer's built-in camera
110 Mechanical structure that clips or mounts onto the tablet computer
111 Panoramic mirror
112 Tablet computer's built-in camera
121 The same projection unit as 20
122 Floor stand
123 Acoustic piano
124 Optional tablet computer (shown) or notebook computer, same as 22
130 Opening, glass or other translucent material
131 Conventional projector light engine
132 LED light sources (red, green, and blue)
133 Dichroic mirrors
134 Lens or a set of lens
135 Image generator (DMD as shown)
136 Reflective mirror
137 Electrical components
138 Printed circuit board
139 Image redirection mirror
141 Projector light engine
142 Top split mirror
143 Bottom split mirror
151 Projected images from the embodiment shown in FIG. 14
161 Projector light engine
162 Small split mirror #1
163 Small split mirror #2
164 Big mirror #1
165 Big mirror #2
171 Projector light engine
172 Image mirror
173 Small split mirror #1
174 Small split mirror #2
175 Big mirror #1
176 Big mirror #2
181 Standard piano keyboard
182 Key indicator projected in the shape of a hand
183 Notes projected to the keyboard
191 Automatically select a segment to practice
192 Stored user preferences
193 Stored practice history
194 Beginning mode
195 Intermediate mode
196 Advanced mode
201 Project key indicators and notes to the keyboard
202 Calculate score
203 Dim projected key indicators
204 Enhance projected key indicators
205 Move on to the intermediate mode
211 Project notes or other supplemental information only to the keyboard
212 Calculate score
213 Return to the beginning mode
214 Advance to the advance mode
221 Mark playback on the sheet being displayed on the computer or tablet computer
222 Return to intermediate mode
223 Go back to the beginning and automatically select the next segment to practice 191
224 Guidance algorithm finished Operation of the System in an Exemplary Embodiment In accordance with an exemplary embodiment of the present invention, to operate the system, a user would set up the image projection apparatus 20 on top of a piano keyboard 21, optionally place a computer or a tablet computer 22 on the projection device's base 13 while in the case of a tablet computer, leaning it against the tablet stand 12. In the case of a piano that supports MIDI, the user would also connect it to the image projection apparatus with an appropriate cable 23, all as shown in FIG. 1 and FIG. 2. A control software will need to be installed either in the microprocessor integrated into the image projection apparatus 20 or on the computer or tablet computer 22 and running. In the case a wireless connection is used to connect the computer and the image projection apparatus, the user may need to go to the computer's wireless settings menu to establish a connection between the two. Each time the projection unit is turned on, it illuminates a pattern in the form of a standard piano keyboard. The user will then adjust the position of the device and the height of the projection unit through the adjustable arm 11 until the pattern precisely align with the piano keyboard. Finally, the user acknowledges that the adjustment has been made either through the control software or through a button on the projection unit. Alternatively, a calibration routine can be incorporated in the computer software to assist the user in this step.

Practice mode can be initiated by choosing a piece from the control software's music library and pressing the appropriate button or menu item. Alternatively, users can also choose to resume a previously unfinished practice session. When the practice session begins, the software follows the algorithm as described elsewhere herein.

While following the algorithm, the control software will communicate with the projection device via the established wired or wireless connection to instruct the projection unit to project the appropriate notes 183 and key indicators 182, at appropriate times. It will also collect the user's playback information via the key press detection system, and adjust the guidance accordingly.

Traditionally, a computer program consists of a finite sequence of computational instructions or program instructions. It will be appreciated that a programmable apparatus (i.e., computing device) can receive such a computer program and, by processing the computational instructions thereof, produce a further technical effect.

A programmable apparatus includes one or more microprocessors, microcontrollers, embedded microcontrollers, programmable digital signal processors, programmable devices, programmable gate arrays, programmable array logic, memory devices, application specific integrated circuits, or the like, which can be suitably employed or configured to process computer program instructions, execute computer logic, store computer data, and so on. Throughout this disclosure and elsewhere a computer can include any and all suitable combinations of a special-purpose computer, programmable data processing apparatus, processor, processor architecture, and so on.

It will be understood that a computer can include a computer-readable storage medium and that this medium may be internal or external, removable and replaceable, or fixed. It will also be understood that a computer can include a Basic Input/Output System (BIOS), firmware, an operating system, a database, or the like that can include, interface with, or support the software and hardware described herein.

Embodiments of the system as described herein are not limited to applications involving conventional computer programs or programmable apparatuses that run them. It is contemplated, for example, that embodiments of the invention as claimed herein could include an optical computer, quantum computer, analog computer, or the like.

Regardless of the type of computer program or computer involved, a computer program can be loaded onto a computer to produce a particular machine that can perform any and all of the depicted functions. This particular machine provides a means for carrying out any and all of the depicted functions.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

According to an embodiment of the present invention, a data store may be comprised of one or more of a database, file storage system, relational data storage system or any other data system or structure configured to store data, preferably in a relational manner. In a preferred embodiment of the present invention, the data store may be a relational database, working in conjunction with a relational database management system (RDBMS) for receiving, processing and storing data. In the preferred embodiment, the data store may comprise one or more databases for storing information related to the processing of moving information and estimate information as well one or more databases configured for storage and retrieval of moving information and estimate information.

Computer program instructions can be stored in a computer-readable memory capable of directing a computer or other programmable data processing apparatus to function in a particular manner. The instructions stored in the computer-readable memory constitute an article of manufacture including computer-readable instructions for implementing any and all of the depicted functions.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

The elements depicted in flowchart illustrations and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these. All such implementations are within the scope of the present disclosure.

In view of the foregoing, it will now be appreciated that elements of the block diagrams and flowchart illustrations support combinations of means for performing the specified functions, combinations of steps for performing the specified functions, program instruction means for performing the specified functions, and so on.

It will be appreciated that computer program instructions may include computer executable code. A variety of languages for expressing computer program instructions are possible, including without limitation C, C++, Java, JavaScript, assembly language, Lisp, HTML, Perl, and so on. Such languages may include assembly languages, hardware description languages, database programming languages, functional programming languages, imperative programming languages, and so on. In some embodiments, computer program instructions can be stored, compiled, or interpreted to run on a computer, a programmable data processing apparatus, a heterogeneous combination of processors or processor architectures, and so on. Without limitation, embodiments of the system as described herein can take the form of web-based computer software, which includes client/server software, software-as-a-service, peer-to-peer software, or the like.

In some embodiments, a computer enables execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. The thread can spawn other threads, which can themselves have assigned priorities associated with them. In some embodiments, a computer can process these threads based on priority or any other order based on instructions provided in the program code.

Unless explicitly stated or otherwise clear from the context, the verbs "execute" and "process" are used interchangeably to indicate execute, process, interpret, compile, assemble, link, load, any and all combinations of the foregoing, or the like. Therefore, embodiments that execute or process computer program instructions, computer-executable code, or the like can suitably act upon the instructions or code in any and all of the ways just described.

Throughout this disclosure and elsewhere, block diagrams and flowchart illustrations depict methods, apparatuses (i.e., systems), and computer program products. Each element of the block diagrams and flowchart illustrations, as well as each respective combination of elements in the block diagrams and flowchart illustrations, illustrates a function of the methods, apparatuses, and computer program products. Any and all such functions ("depicted functions") can be implemented by computer program instructions; by special-purpose, hardware-based computer systems; by combinations of special purpose hardware and computer instructions; by combinations of general purpose hardware specialized through computer instructions; and so on—any and all of which may be generally referred to herein as a "circuit," "module," or "system."

While the foregoing drawings and description set forth functional aspects of the disclosed systems, no particular arrangement of software for implementing these functional aspects should be inferred from these descriptions unless explicitly stated or otherwise clear from the context.

Each element in flowchart illustrations may depict a step, or group of steps, of a computer-implemented method. Further, each step may contain one or more sub-steps. For the purpose of illustration, these steps (as well as any and all other steps identified and described above) are presented in order. It will be understood that an embodiment can contain an alternate order of the steps adapted to a particular application of a technique disclosed herein. All such variations and modifications are intended to fall within the scope of this disclosure. The depiction and description of steps in any particular order is not intended to exclude embodiments having the steps in a different order, unless required by a particular application, explicitly stated, or otherwise clear from the context.

The functions, systems and methods herein described could be utilized and presented in a multitude of languages. Individual systems may be presented in one or more languages and the language may be changed with ease at any point in the process or methods described above. One of ordinary skill in the art would appreciate that there are numerous languages the system could be provided in, and embodiments of the present invention are contemplated for use with any language.

While multiple embodiments are disclosed, still other embodiments of the present invention will become apparent to those skilled in the art from this detailed description. The invention is capable of myriad modifications in various obvious aspects, all without departing from the spirit and scope of the present invention. Accordingly, the drawings and descriptions are to be regarded as illustrative in nature and not restrictive.

The invention claimed is:

1. A projection apparatus for altering an aspect ratio of a projected image, said projection apparatus comprising:
   a projector light engine;
   two mirrors, with a first mirror placed on top of a second mirror;
   a third mirror aligned with said first mirror; and
   a fourth mirror aligned with said second mirror,
      wherein said first mirror is placed and angled such that it redirects a first half of an image generated by said projector light engine towards said third mirror that is configured to further redirect said first half of the image to a first half of an intended display area, and wherein said second mirror is placed and angled such that it redirects a second half of the image generated by said projector light engine towards said fourth mirror that is configured to further redirect said second half of the image to a second half of said intended display area, thereby collectively causing the image to be aligned on said intended display area,
      whereby the projection apparatus allows said projector light engine with a nominal aspect ratio to illuminate the intended display area with an aspect ratio greater than said nominal aspect ratio originally projected by said projector light engine without being placed excessively high above said display area.

2. The projection apparatus of claim 1, further comprising:
   a fifth mirror which redirects said image from said projector light engine towards said first and second mirrors,
   whereby said fifth mirror enlarges said image produced by said projector light engine without significantly increasing the distance between said projector light engine and said first and second mirrors, which helps reduce possible defects introduced due to manufacturing tolerances in aligning said first and second mirrors.

* * * * *